(12) United States Patent  
Eisen et al.

(10) Patent No.: US 7,008,147 B2  
(45) Date of Patent: *Mar. 7, 2006

(54) CUTTING TOOL WITH EDGE-ON MOUNTED INSERTS

(75) Inventors: Yaron Eisen, Kfar Vradim (IL); Tsahi Ashkenazi, Karmiel (IL)

(73) Assignee: Iscar Ltd., Tefen (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/814,277

(22) Filed: Apr. 1, 2004

(65) Prior Publication Data

US 2004/0184892 A1 Sep. 23, 2004

Related U.S. Application Data

(63) Continuation of application No. 10/184,971, filed on Jul. 1, 2002, now Pat. No. 6,733,213.

(30) Foreign Application Priority Data

Jul. 2, 2001 (IL) .................................... 144090

(51) Int. Cl.  
*B23B 27/00* (2006.01)

(52) U.S. Cl. .......................... 407/70; 407/104; 82/83

(58) Field of Classification Search ................. 407/67, 407/70, 104, 33, 34, 35, 44, 45, 46, 51, 56; 82/83, 70.2, 113, 130  
See application file for complete search history.

(56) References Cited

U.S. PATENT DOCUMENTS

| | | | |
|---|---|---|---|
| 2,900,704 A | 8/1959 | Sweet | |
| 3,078,547 A | 2/1963 | Sweet | |
| 3,455,002 A | 7/1969 | Miller | |
| 4,206,664 A | 6/1980 | Miyagawa | |
| 4,231,691 A * | 11/1980 | Pape et al. | ................ 408/185 |
| 4,608,755 A | 9/1986 | Braasch | |
| 4,844,667 A | 7/1989 | Simmonds et al. | |
| 5,049,011 A * | 9/1991 | Bohnet et al. | ............. 408/223 |
| 5,256,008 A | 10/1993 | Hansson et al. | |
| 5,513,932 A | 5/1996 | Asada | |
| 5,529,440 A | 6/1996 | Schmidt | |
| 5,653,152 A | 8/1997 | Oles et al. | |
| 5,704,736 A * | 1/1998 | Giannetti | .................... 407/35 |
| 5,916,343 A | 6/1999 | Huang et al. | |
| 5,919,008 A | 7/1999 | Shimomura | |
| 6,733,213 B1 * | 5/2004 | Eisen et al. | .................. 407/70 |

FOREIGN PATENT DOCUMENTS

JP      6262422      9/1994

* cited by examiner

*Primary Examiner*—Willmon Fridie, Jr.  
(74) *Attorney, Agent, or Firm*—Womble Carlyle

(57) ABSTRACT

A rectangular blade-type cutting tool having two edge-on cutting inserts mounted at one end of the blade in a staggered formation with their cutting edges partially overlapping. This type of cutting blade finds particular application in disc-type cutting tool assemblies used for cutting pipes. In such a cutting tool assembly the blade-type cutting tools in accordance with the present invention are equally peripherally distributed on an end face of the cutting tool assembly with the operative cutting edges of each of cutting blade inwardly directed and equally distanced with respect to the axis of rotation of the cutting tool assembly. With such a cutting tool assembly it is only necessary to cut the thickness of a pipe without the necessity of passing across its entire diameter allowing for quick and economical cutting of the pipe.

25 Claims, 6 Drawing Sheets

CUTTING TOOL WITH EDGE-ON MOUNTED INSERTS

RELATED APPLICATIONS

This is Continuation of application Ser. No. 10/184,971, filed Jul. 1, 2002, now U.S. Pat. No. 6,733,213.

FIELD OF THE INVENTION

The present invention relates to a cutting tool having two edge-on mounted inserts that is capable of performing cutting operations by means of an overlapping configuration of the cutting inserts.

BACKGROUND OF THE INVENTION

Cutting tools having edge-on mounted inserts are known. Such a tool is shown, for example, in U.S. Pat. No. 5,529,440 to Schmidt. As shown in '440, a single cutting insert is mounted edge-on on a front end of a blade. When performing parting or slotting operations with such a tool, the width of the slot is limited to the width of the operative cutting edge of the cutting insert.

Another tool having edge-on mounted inserts is shown in Japanese Publication Number 06262422 A to Naoaki. As shown in FIG. 6 of '422, the cutting inserts are alternatingly arranged on the periphery of a disc body. The described arrangement enables overlapping of the operative cutting edges of succeeding cutting inserts for obtaining a wider slot than can be obtained by a single cutting insert.

Such a tool suffers from the disadvantage that if an insert pocket breaks due to a breakage of a cutting insert than it is necessary to replace the entire disc body. Furthermore, in such a tool, the cutting diameter is fixed and depends on the diameter of the disc body. It is an object of the present invention to provide a cutting tool that significantly reduces or overcomes the aforementioned disadvantages.

It is a further object of the present invention to provide a cutting tool to part a fixed pipe by cutting around it without being limited by the diameter of the pipe.

SUMMARY OF THE INVENTION

In accordance with the present invention there is provided a cutting tool comprising a blade and two cutting inserts mounted therein. The blade has a front insert retaining portion and a rear body portion, defining a front to rear longitudinal direction. The front insert retaining portion is provided with exactly two insert receiving pockets, one above the other and separated by a rearwardly extending recess, in a side view of the blade. The two insert receiving pockets are formed on opposite sides of the blade with a first insert receiving pocket formed in a right side face of the front insert retaining portion and a second insert receiving pocket formed in a left side face of the front insert retaining portion. A first cutting insert is clamped in the first insert receiving pocket and a second cutting insert is clamped in the second insert receiving pocket.

The two cutting inserts may be identical.

Each insert receiving pocket may comprise a side wall provided with a threaded bore extending in a direction transverse to a width of the body portion, and each cutting insert may have a through bore and may be retained in a corresponding insert receiving pocket by a clamping screw that passes through the through bore and threadingly engages the threaded bore.

Each cutting insert may further have a top surface, a bottom surface and a side surface connecting the top and bottom surfaces, at least one cutting edge extending on the side surface substantially between the top and bottom surfaces, the through bore extending between the top and bottom surfaces, with the bottom surface of the cutting insert abutting the side wall of the insert receiving pocket.

Each insert receiving pocket may comprise a rear wall, transversely directed to the longitudinal direction and substantially perpendicular to the right and left side faces; a lower wall adjacent to the rear wall and substantially perpendicular to the right and left side faces; a side wall that is substantially perpendicular to the rear and lower walls; and a threaded bore formed in the side wall.

The body portion may extend rearwardly from the insert retaining portion in the longitudinal direction, the body portion being prismoidal in shape having a right side face and a left side face connected by top and bottom faces According to a specific embodiment of the present invention, the side wall of each of the insert receiving pockets is slanted at an acute angle ($\delta$) with respect to an adjacent side face of the insert retaining portion.

Typically, the slant angle ($\delta$) is 2°.

Typically, the side wall of a first of the two insert receiving pockets is adjacent the right side face of the insert retaining portion and the side wall of a second of the two insert receiving pockets is adjacent the left side face of the insert retaining portion.

Generally, the body portion extends rearwardly from the insert retaining portion in the longitudinal direction (A), the body portion being generally prismoidal in shape, having a right side face and a left side face connected by top and bottom faces.

Typically, the right side face of the body portion is parallel to the left side face of the body portion.

Further typically, the top face is parallel to the bottom face in a side view of the blade.

Preferably, a distance (W) between the right and left side faces of the body portion is substantially smaller than a height dimension (H1) between the top and bottom faces.

According to a specific embodiment of the present invention, the top face and the bottom face are slanted at an acute angle ($\alpha$) with respect to the left side face of the body portion.

Preferably, the insert retaining portion has a height dimension (H2) that is larger than the height dimension (H1) between the top and bottom faces of the body portion.

Generally, the lower walls of each of the insert receiving pockets define therebetween an internal acute angle ($\beta$).

Typically, the internal acute angle ($\beta$) is in the range of 0° to 50°.

Further typically, the threaded bore is substantially perpendicular to the adjacent of the side faces of the insert retaining portion.

Generally, each of the two cutting inserts has a polygonal shape.

According to a specific embodiment of the present invention, each of the two cutting inserts has two pairs of diametrically opposed identical cutting edges.

Preferably, in a front view of the cutting tool the two cutting edges overlap between planes (P5, P6) passing through inner extremities of the cutting edges and parallel to the side faces of the insert retaining portion.

Further preferably, each of the two cutting inserts protrudes outwardly with respect to a side face of the blade adjacent the top surface of the cutting insert.

Typically, the at least one cutting edge of each of the two cutting inserts is equally distanced from an apex (Q) of the internal acute angle ($\beta$).

Generally, the cutting tool has a cutting width (W1) between 6 to 10 mm.

Typically, the body portion is integrally connected to the insert retaining portion.

According to a specific embodiment of the present invention, the two cutting inserts are identical.

Typically, each of the cutting inserts is made of cemented carbide.

Further typically, the blade is made of tool steel.

There is also provided in accordance with the present invention, a cutting tool assembly comprising a plurality of cutting tools according to the present invention, wherein the plurality of the cutting tools are clamped on an annular disc having an axis of rotation (O).

Preferably, the operative cutting edges of the various cutting inserts on the cutting tools are equally distanced from the axis of rotation (O).

Preferably, the plurality of the cutting tools are equally peripherally distributed on an end face of said disc.

Typically, the insert retaining portion of each of the cutting tools is inwardly directed with respect to the axis of rotation (O).

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 1:
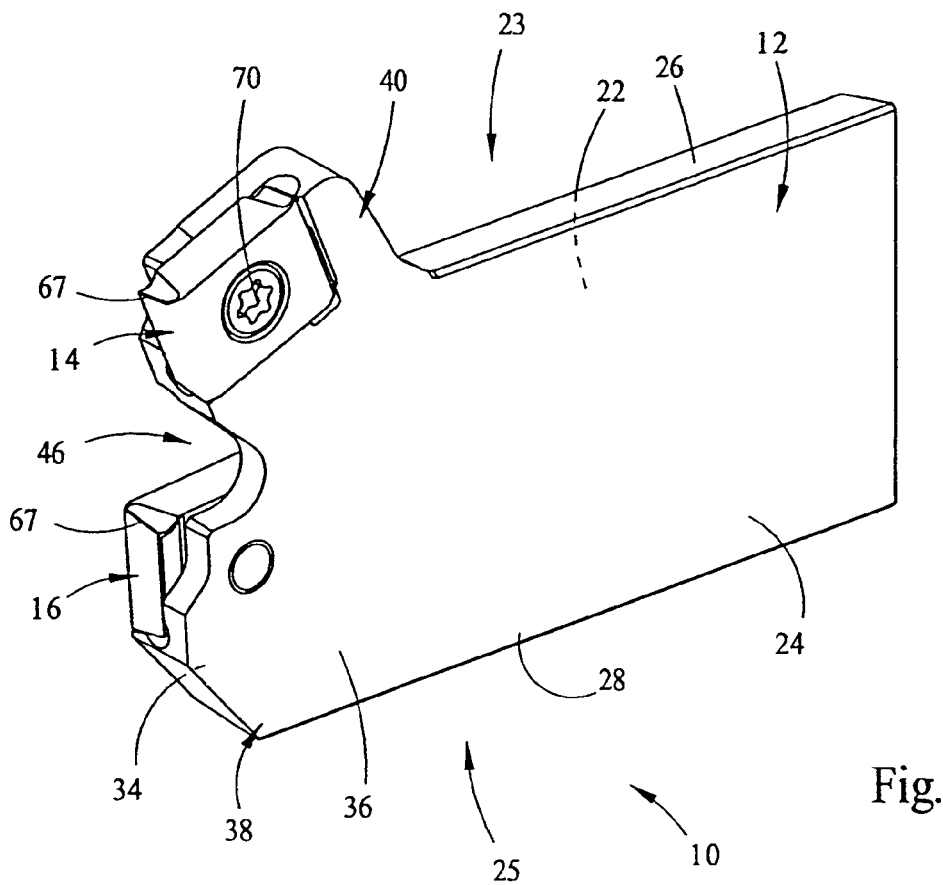
FIG. 1 is a perspective view of a cutting tool according to the present invention.
Figure 2:
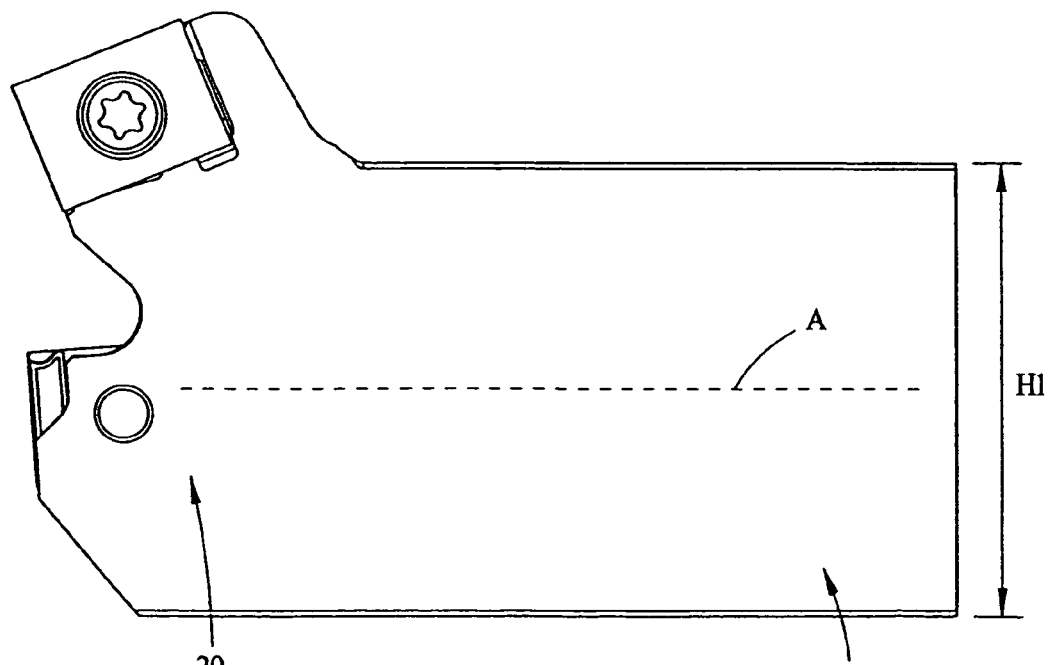
FIG. 2 is a side view of the cutting tool of FIG. 1.

Attention is drawn to FIGS. 1 to 11. As shown, a cutting tool 10 comprises a blade 12 and two cutting inserts 14 and 16 mounted therein. The blade is made of tool steel and the cutting inserts are made of cemented carbide, for example, tungsten carbide. The blade 12 has a rear body portion 18, having a height H1, that, according to a preferred embodiment of the present invention, is integrally connected to a front insert retaining portion 20 having a height H2. A front to rear longitudinal direction A is defined from the insert retaining portion 20 to the body portion 18. According to a preferred embodiment, the body portion 18 extends rearwardly from the insert retaining portion 20 in the longitudinal direction A. The blade 12 has a right side 19 and a left side 21 that extend between an upper side 23 and a lower side 25.

The body portion 18 generally has a prismoidal shape having a right side face 22, parallel to a left side face 24 and a top face 26, parallel, in a side view of the blade 12, to a bottom face 28. A width W of the body portion 18 is substantially smaller that the height H1 of the body portion. In order to secure the clamping of the blade 12 to a machine as shown, for example, in FIG. 11, according to one embodiment, the top face 26 and the bottom face 28 are slanted at an acute angle $\alpha$ with respect to the left side face 24. According to another embodiment, not shown in the figures, the blade is retained to a blade holder by means of screws passing through through bores that extend between the right side and the left side of the blade.

The insert retaining portion 20 has a right side face 34 parallel to a left side face 36, a bottom portion 38 has a lower surface substantially aligned with the bottom face 28 of the body portion 18, and, a top portion 40 that protrudes upwardly with respect to the top face 26 of the body portion 18. Hence, the height H2 of the insert retaining portion 20 is larger than the height H1 of the body portion 18. The insert retaining portion 20 comprises an upper insert receiving pocket 42, located in the top portion 40, and a lower insert receiving pocket 44, located in the bottom portion 38. The upper insert receiving pocket 42 is upwardly located with respect to the lower insert receiving pocket 44 and is separated therefrom by a rearwardly extending recess 46.

The two insert receiving pockets are similar and therefore only one of them will be described. The upper insert receiving pocket 42 comprises a rear wall 48 that is transversely directed with respect to the longitudinal direction A and is substantially perpendicular to the right side face 34. A lower wall 50 is located adjacent and in front of the rear wall 48, perpendicular thereto, and substantially perpendicular to the right side face 34. It will be appreciated that cutting inserts having other geometries can be used. If, for example, a triangular cutting insert is used, then clearly the lower wall 50 will not be perpendicular to the rear wall 48, but will make an appropriate angle therewith. A side wall 52 is located adjacent the rear wall 48 and the lower wall 50 and is substantially perpendicular to each one of them. The side wall 52 of each of the insert receiving pockets is slanted at an acute angle $\delta$ with respect to the adjacent side face of the insert retaining portion 20. Typically, the angle $\delta$ is 2°. A threaded bore 54 extends, substantially perpendicularly, from the side wall 52 to the right side face 34. It is understood that the threaded bore 54 of the lower insert receiving pocket 44 extends, substantially perpendicularly, from the side wall 52 of the lower insert receiving pocket to the left side face 36. Therefore, it can be said that each of the insert receiving pockets is directed towards a different side face of the insert retaining portion 20, namely, the upper insert receiving pocket 42 is directed towards the left side of the blade 12 and the lower insert receiving pocket 44 is directed towards the right side of the blade 12.

A distance D1 from the side wall 52 of the upper insert receiving pocket 42 to the right side face 34 is smaller than a distance D2 from the side wall 52 of the upper insert receiving pocket 42 to the plane of the left side face 36. Similarly, a distance D3 from the side wall 52 of the lower insert receiving pocket 44 to the left side face 36 is smaller than a distance D4 from the side wall 52 of the lower insert receiving pocket 44 to the plane of the right side face 34.

Planes P1 and P2 pass through the lower wall 50 of each of the insert receiving pockets 42 and 44, respectively. The planes P1 and P2 define therebetween an internal acute angle $\beta$ having an apex Q. The internal acute angle $\beta$ is typically in the range of 0° to 50°.

In accordance with a preferred embodiment, the two cutting inserts 14 and 16 are identical and therefore only one of them will be described. The cutting insert has a generally prismoidal shape, having a top surface 56, a bottom surface 58 and a side surface 60 connecting between the top and bottom surfaces. The side surface 60 has two parallel upper and lower walls 62, 63 and two parallel front and rear walls 64, 65 that are perpendicular to the upper and lower walls 62, 63. A through bore 66, having an axis B, extends between the top and bottom surfaces 56, 58, substantially perpendicular to them.

The cutting insert has a vertical symmetry plane P3 that contains the axis B and is parallel to the front and rear walls 64, 65 and a horizontal symmetry plane P4 that contains the axis B and is parallel to the upper and lower walls 62, 63. The juncture between each of the upper and lower walls 62, 63 and each of the front and rear walls 64, 65 defines a cutting edge 67. Each cutting edge 67 being slanted at an acute angle γ with respect to the symmetry plane P4 and having a rake surface 68 at the adjacent upper and lower side walls 62, 63. An indented relief surface 69 is provided on the bottom surface 58 adjacent each of the rake surfaces 68.

Figure 3:
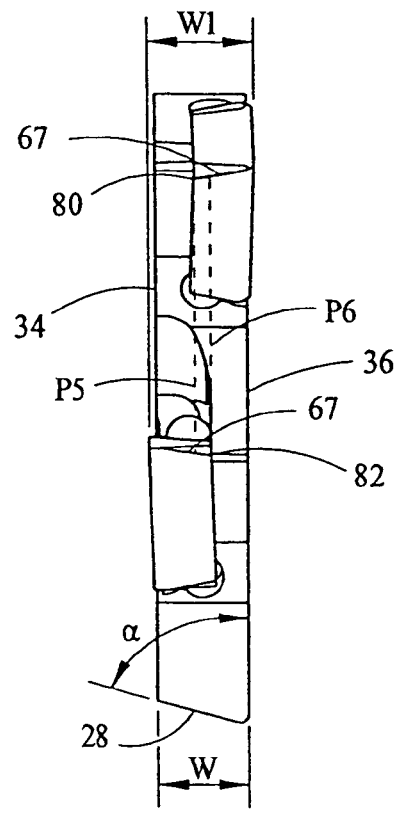
FIG. 3 is a front view of the cutting tool of FIG. 1.
Figure 4:
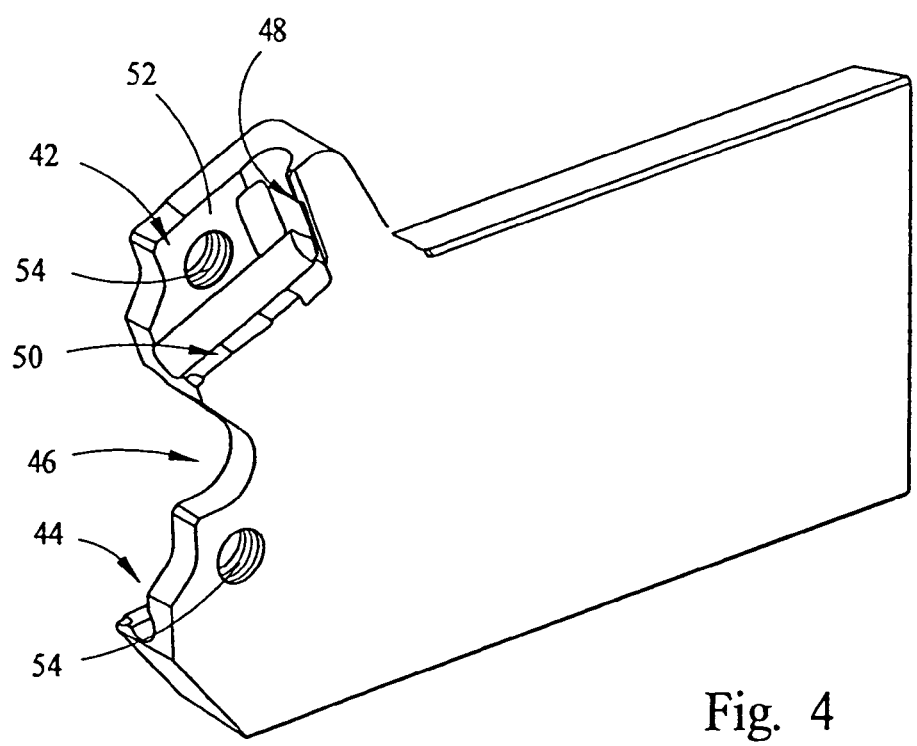
FIG. 4 is a perspective view of the blade shown in FIG. 1.
Figure 5:
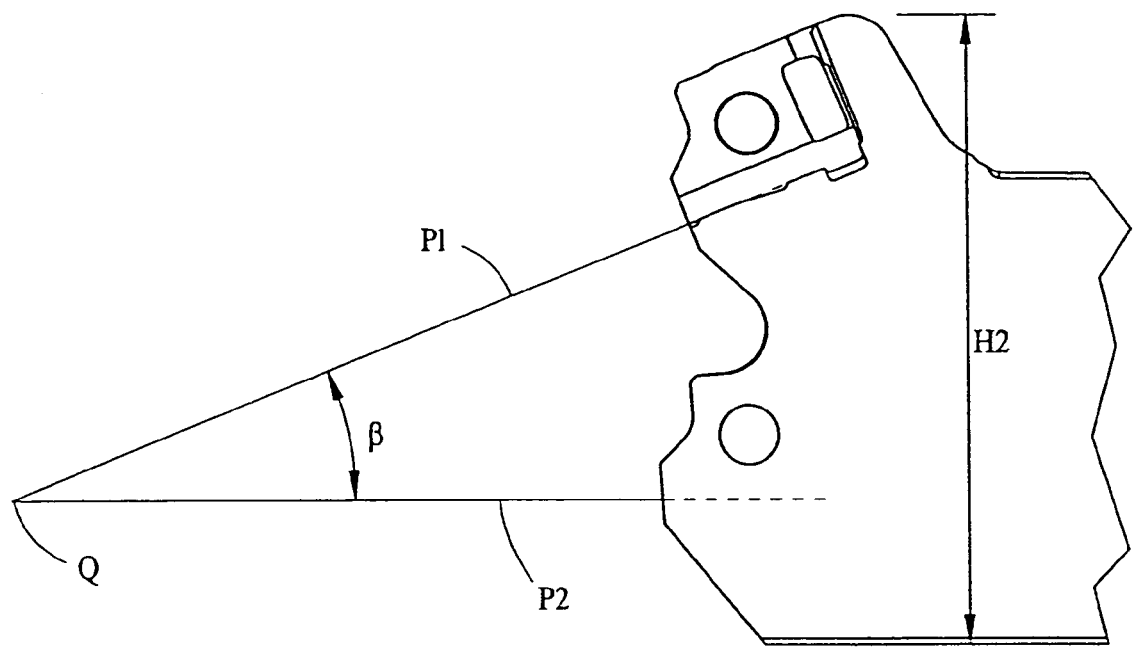
FIG. 5 is a side view of the blade of FIG. 4.
Figure 6:
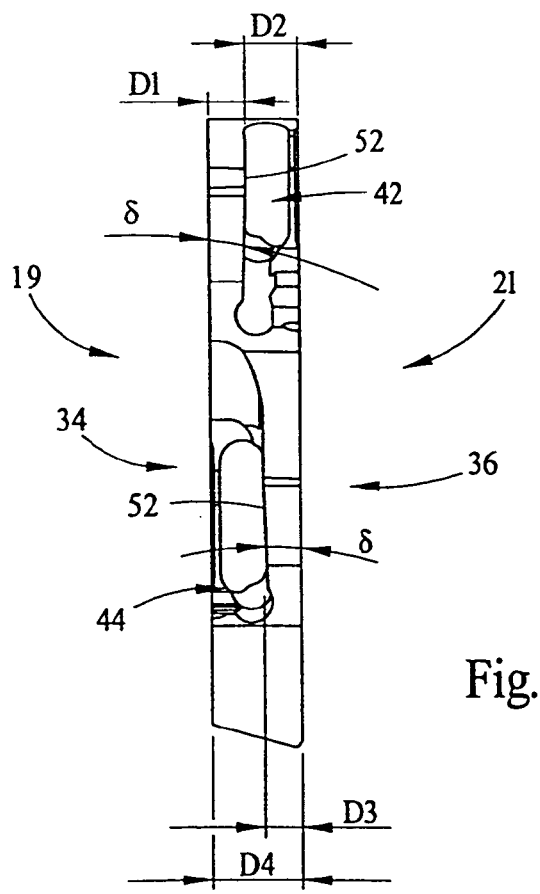
FIG. 6 is a front view of the blade of FIG. 4.

Each of the cutting inserts is retained to its pocket by a clamping screw 70 that passes through the through bore 66 and threadingly engages the threaded bore 54 in the insert receiving pocket. As already mentioned, each of the insert receiving pockets is directed towards a different side face of the insert retaining portion 20, therefore, also the clamped cutting inserts 14 and 16 face different sides of the cutting tool 10. As seen in FIGS. 1 and 3, the operative cutting edges 67 of the cutting inserts 14 and 16 are oppositely slanted. As best seen in FIG. 3, in a front view of the cutting tool 10 the two operative cutting edges 67 overlap between planes P5 and P6 that pass through respective inner extremities 80 and 82 of the cutting edges and are parallel to the side faces 34 and 36 of the insert retaining portion 20. The recess 46 serves as a chip gullet for the operative cutting edge of the cutting insert 16 that is retained in the lower insert receiving pocket 44.

In general, the two cutting inserts are directed so that they present the same orientation with respect to a workpiece that is machined by the cutting tool 10. That is, each of the cutting inserts has the same rake and relief angles with respect to the workpiece.

The cutting insert described above has four cutting edges, that is, two pairs of diametrically opposed identical cutting edges 67. The indexing of such a cutting insert takes place as follows: when a cutting edge is worn and it is necessary to place a new cutting edge instead, the cutting insert is taken out of its insert receiving pocket and rotated 180° around the axis B to present the diametrically opposed cutting edge as the new operative cutting edge. The use of the two other cutting edges takes place in the other insert receiving pocket.

According to another embodiment of a cutting insert according to the present invention, the cutting insert is square and has four identical cutting edges having a 90° rotational symmetry between them. In such a case, the cutting insert does not have vertical or horizontal symmetry planes.

Figure 7:
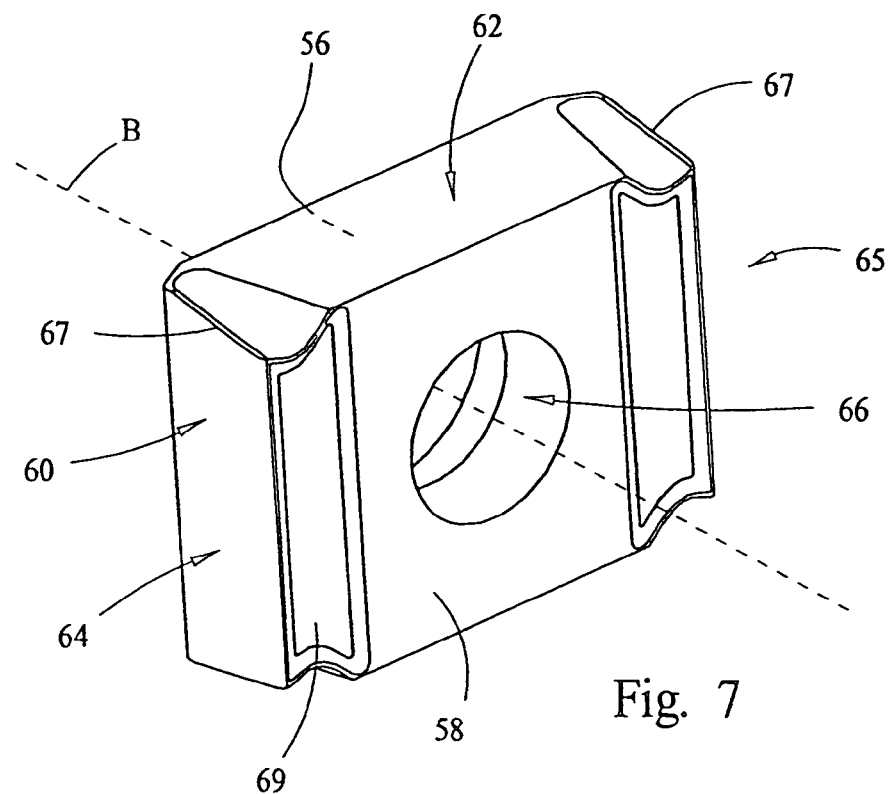
FIG. 7 is a perspective view of one of the cutting inserts shown in FIG. 1.
Figure 8:
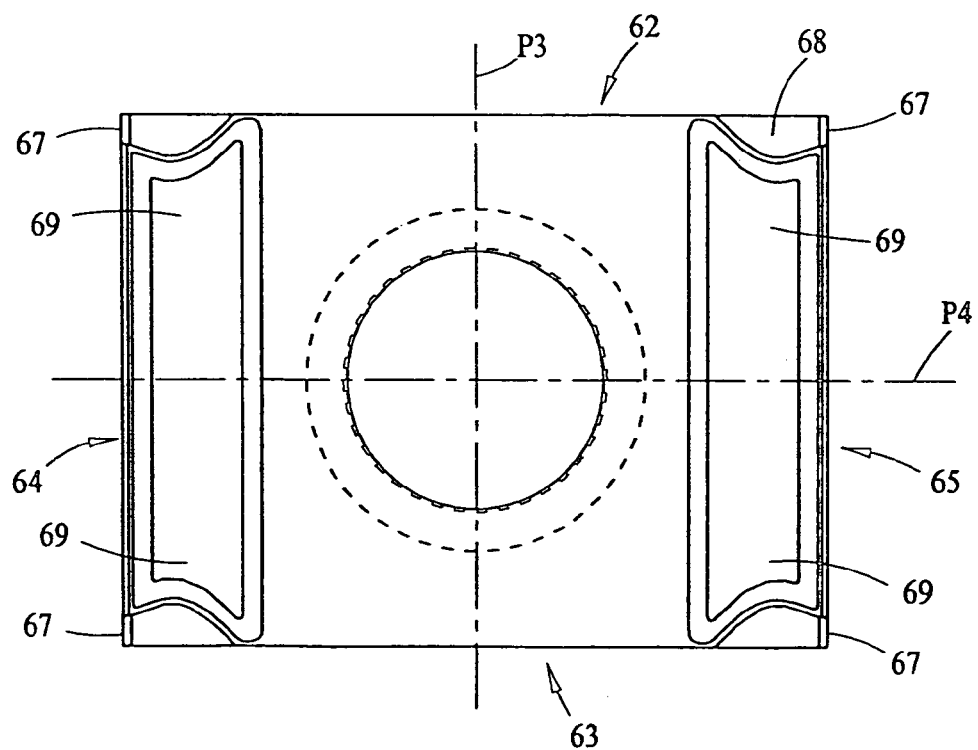
FIG. 8 is a bottom view of the cutting insert of FIG. 7.
Figure 9:
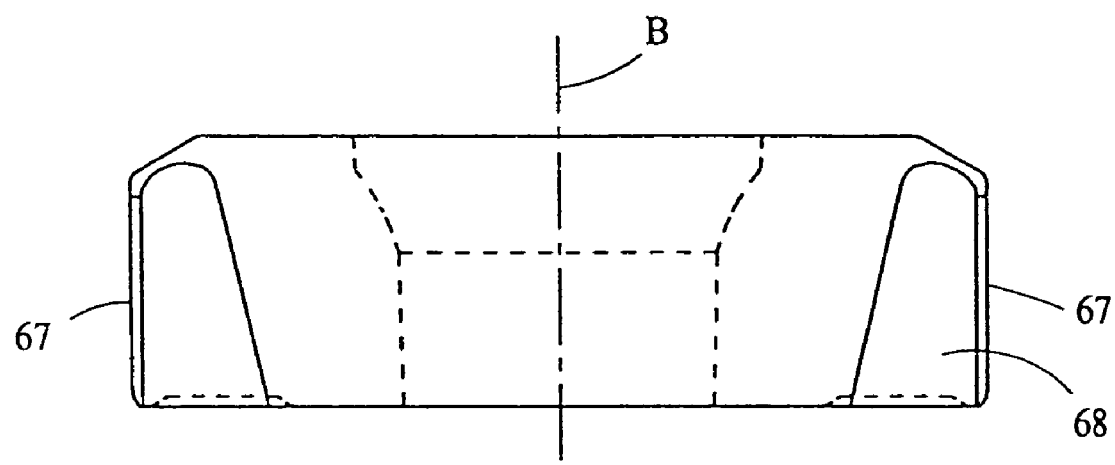
FIG. 9 is a side view of the cutting insert of FIG. 7.
Figure 10:
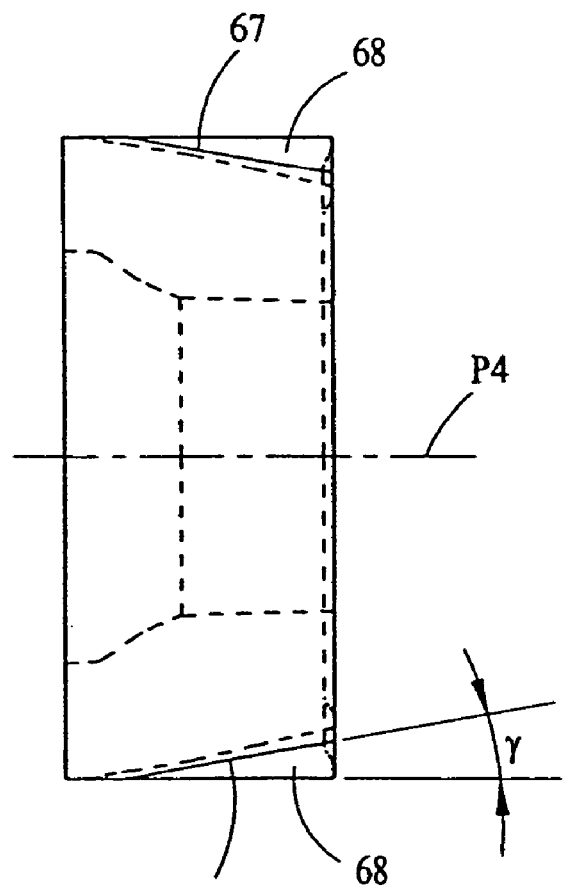
FIG. 10 is a front view of the cutting insert of FIG. 7.

According to another embodiment of a cutting insert according to the present invention, the cutting insert shown in FIG. 7 is mirror-duplicated with respect to the bottom surface 58. In which case, and depending on the overlapping required between the cutting edges of adjacent cutting inserts, the cutting insert has eight effective cutting edges.

According to another embodiment of a cutting insert according to the present invention, the cutting insert is a triangle having 120° rotational symmetry between its three or six cutting edges.

Figure 11:
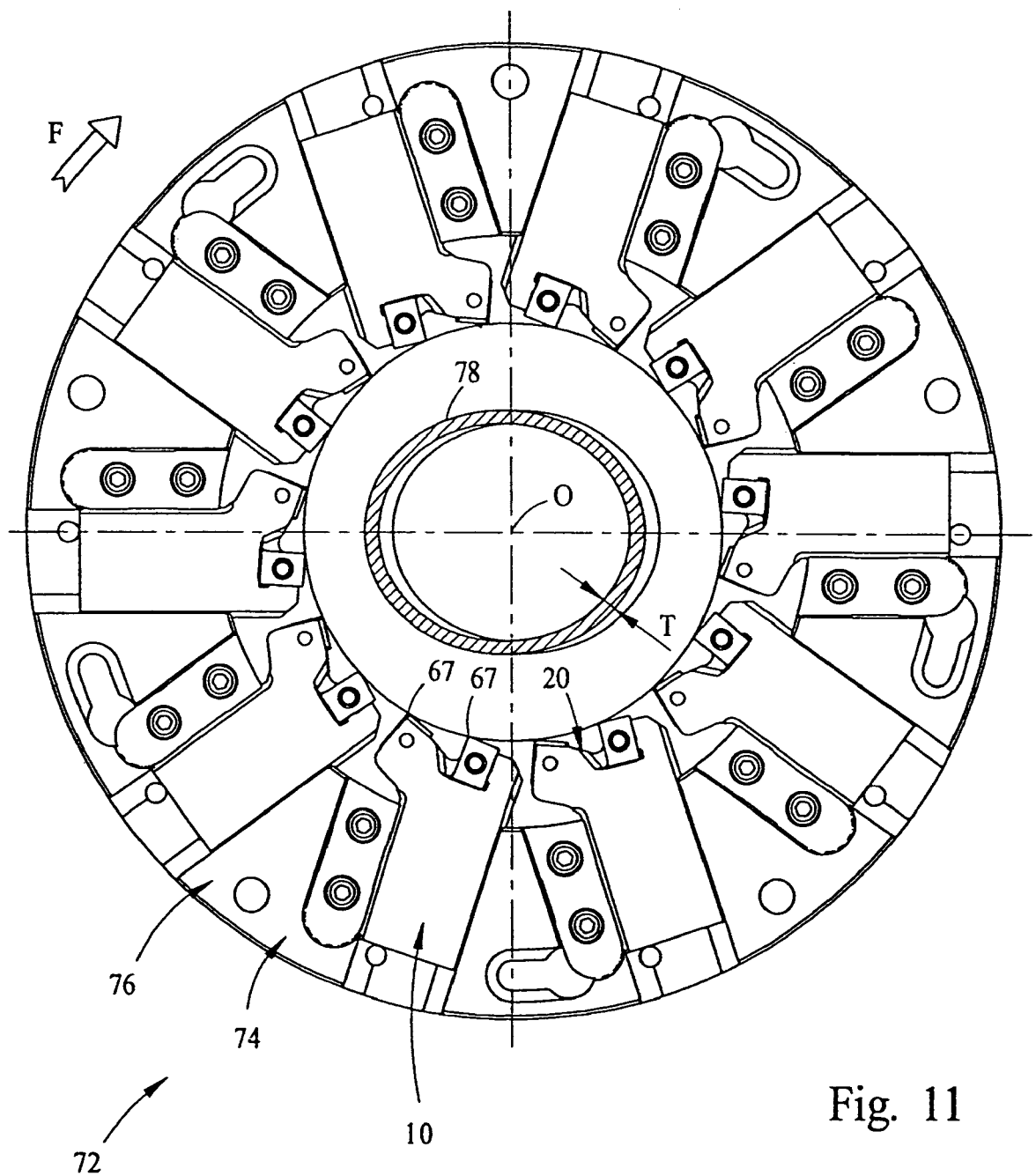
FIG. 11 is an end view of a preferred embodiment of a cutting tool assembly using a plurality of the cutting tool of FIG. 1.

FIG. 11 is an end view of a preferred embodiment of a cutting tool assembly 72, having an axis of rotation O and using a plurality of cutting tools 10 clamped on a disc 74. The cutting tools 10 are equally peripherally distributed on an end face 76 of the cutting tool assembly 72 such that the insert retaining portion 20 of each of the cutting tool 10 is inwardly directed with respect to the axis of rotation O. Each of the operative cutting edges 67 is equally distanced from the axis of rotation O. Each blade 12 is retained to the disc 74 by a clamping mechanism that is not described in detail since it is not an essential feature of the present invention.

The cutting tool assembly 72 is used for cutting a pipe 78 having a wall thickness T. The pipe 78 is shown as an ellipse since, in this case, the cutting plane of the cutting tool assembly 72 is not perpendicular to the axis of the pipe. In order to perform the cutting, the pipe 78 stands still in place while the cutting tool assembly 72 rotates around it in the direction F. The movement of the cutting tool assembly 72 is a combination of two separate movements; the first, being a rotational movement around the axis O, the second, being a translation movement on an inwardly converging spiral around the elliptical contour of the pipe 78.

By means of the construction and operation of the cutting tool assembly 72 there is obtained a quick and economical cutting of the pipe 78 since it is only necessary to cut the thickness T of the pipe 78 without the necessity of passing across its entire diameter. The width of cut W1 (see FIG. 3), in each cutting tool 10, is obtained by the combined width of the operative cutting edges of the two cutting inserts. If small amendments in the width of cut are required, within about 1 mm, it is possible to change the dimensions D1 and D3 for changing the amount of overlapping between the two cutting inserts, without changing the size of the cutting inserts.

In the case described above, when cutting a pipe 78 obliquely to its axis, cutting inserts of the cutting tool assembly 72, that face the same direction, are subjected to axial forces when they first come in contact with the pipe since the cutting inserts that face the other direction have not yet made contact with the pipe. Since the cutting inserts are mounted edge-on in the insert receiving pockets, the axially mounted clamping screw 70 assists in resisting those axial forces that tend to remove the cutting inserts out of their pockets. This is an advantage of the present cutting tool assembly with respect to cutting tool assemblies known in the art that use cutting inserts wedged in recesses along the periphery of a saw blade and held in the recesses by means of elastic forces exerted by the blade. Such a prior art saw blade, as shown, for example, in U.S. Pat. No. 5,524,518 to Sundström, have less resistance against axial cutting forces relative to the cutting tool assembly of the present invention.

Although the present invention has been described to a certain degree of particularity, it should be understood that various alterations and modifications could be made without departing from the spirit or scope of the invention as hereinafter claimed.

What is claimed is:

1. A cutting tool comprising:
   a blade having a front insert retaining portion and a rear body portion, defining a front to rear longitudinal direction, the front insert retaining portion having a width dimension that is smaller than a height dimension thereof, in a front view of the blade;

the front insert retaining portion being provided with exactly two insert receiving pockets, one situated above the other along the height dimension and separated by a rearwardly extending recess, in a side view of the blade;

the two insert receiving pockets being formed on opposite sides of the blade with a first insert receiving pocket formed in a right side face of the front insert retaining portion and a second insert receiving pocket fanned in a left side face of the front insert retaining portion; and a first cutting insert clamped in the first insert receiving pocket and a second cutting insert clamped in the second insert receiving pocket.

2. The cutting tool according to claim 1, wherein the two cutting inserts are identical.

3. The cutting tool according to claim 1, wherein each insert receiving pocket comprises a side wall provided with a threaded bore extending in a direction transverse to a width of the body portion; and each cutting insert has a through bore and is retained in a corresponding insert receiving pocket by a clamping screw tat passes through the through bore and threadingly engages the threaded bore.

4. The cutting tool according to claim 3, wherein each cutting insert has a top surface, a bottom surface and a side surface connecting the top and bottom surfaces, at least one cutting edge extending on the side surface substantially between the top and bottom surfaces, the through bore extends between the top and bottom surfaces and the bottom surface of the cutting insert abuts the side wall of the insert receiving pocket.

5. The cutting tool according to claim 4, wherein each cutting insert has a polygonal shape.

6. The cutting tool according to claim 4, wherein each cutting insert has two pairs of diametrically opposed identical cutting edges.

7. The cutting tool according to claim 4, wherein in a front view of the cutting tool the two cutting edges overlap between planes (P5, P6) passing through inner extremities of the cutting edges and parallel to side faces of the insert retaining portion.

8. The cutting tool according to claim 4, wherein each of the two cutting inserts protrudes outwardly with respect to a side face of the blade adjacent the top surface of the cutting insert.

9. The cutting tool according to claim 1, wherein each insert receiving pocket comprises:

a rear wall, transversely directed to the longitudinal direction and substantially perpendicular to the right and left side faces;

a lower wall adjacent to the rear wall and substantially perpendicular to the right and left side faces;

a side wall that is substantially perpendicular to the rear and lower walls; and a threaded bore formed in the side wall.

10. The cutting tool according to claim 9, wherein the side wall of each insert receiving pocket is adjacent a corresponding side face of the insert retaining portion.

11. The cutting tool according to claim 10, wherein the side wall of each insert receiving pocket is slanted at an acute angle ($\delta$) with respect to the adjacent side face of the insert retaining portion.

12. The cutting tool according to claim 10, wherein the threaded bore is substantially perpendicular to the adjacent side face of the insert retaining portion.

13. The cutting tool according to claim 9, wherein the lower walls of each of the insert receiving pockets define therebetween an internal acute angle ($\beta$).

14. The cutting tool according to claim 13, wherein the internal acute angle ($\beta$) is in the range of 0° to 50°.

15. The cutting tool according to claim 13, wherein each cutting insert has at least one cutting edge that equally distanced from an apex (Q) of the internal acute angle ($\beta$).

16. The cutting tool according to claim 1, wherein the body portion extends rearwardly from the insert retaining portion in the longitudinal direction, the body portion being prismoidal in shape having a right side face and a left side face connected by top and bottom faces.

17. The cutting tool according to claim 16, wherein a distance (W) between right and left side faces of the body portion is substantially smaller than a height dimension (H1) between top and bottom faces of the body portion.

18. The cutting tool according to claim 16, wherein top face and the bottom face are slanted at an acute angle ($\alpha$) with respect to the left side face of the body portion.

19. The cutting tool according to claim 16, wherein the front insert retaining portion has a height dimension (H2) that is larger than a height dimension (H1) between the top and bottom faces of the body portion.

20. The cutting tool according to claim 1, wherein the body portion is integrally connected to the front insert retaining portion.

21. The cutting tool according to claim 1, wherein the cutting tool has a cutting width (W1) between 6 to 10 mm.

22. A cutting tool assembly comprising:

an annular disc having an axis of rotation (O); and a plurality of cutting tools clamped on said annular disc, each cutting tool comprising:

a blade having a front insert retaining portion and a rear body portion, defining a front to rear longitudinal direction;

the front insert retaining portion being provided with exactly two insert receiving pockets, one above the other and separated by a rearwardly extending recess, in a side view of the blade;

the two insert receiving pockets being formed on opposite sides of the blade with a first insert receiving pocket formed in a right side face of the front insert retaining portion and a second insert receiving pocket formed in a left side face of the front insert retaining portion; and a first cutting insert clamped in the first insert receiving pocket and a second cutting insert clamped in the second insert receiving pocket.

23. The cutting tool assembly according to claim 22, wherein each cutting insert has at least one operating cutting edge, the operative cutting edges of the cutting inserts on the cutting tools being equally distanced from the axis of rotation (O).

24. The cutting tool assembly according to claim 23, wherein the plurality of the cutting tools are equally peripherally distributed on an end face of said disc.

25. The cutting tool assembly according to claim 23, wherein the insert retaining portion of each of the cutting tools is inwardly directed with respect to the axis of rotation (O).

* * * * *